United States Patent [19]
Freitas et al.

[11] Patent Number: 6,003,045
[45] Date of Patent: Dec. 14, 1999

[54] ACCESSING STORED FILES FROM MULTIPLE STORAGE DEVICES

[75] Inventors: Daynerd Kaena Freitas; John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 08/931,880

[22] Filed: Sep. 17, 1997

[51] Int. Cl.$^6$ .................................................. G06F 17/30
[52] U.S. Cl. ................................................ 707/205; 707/1
[58] Field of Search .................. 707/1, 205; 364/222.81, 364/243.4, 282.1; 345/327; 711/114

[56] References Cited

U.S. PATENT DOCUMENTS

| | | | |
|---|---|---|---|
| 5,426,645 | 6/1995 | Haskin ..................................... | 370/477 |
| 5,537,533 | 7/1996 | Staheli et al. ........................ | 395/182.03 |
| 5,564,011 | 10/1996 | Yammine et al. ........................ | 714/15 |
| 5,603,003 | 2/1997 | Akizawa et al. ........................ | 711/114 |
| 5,649,151 | 7/1997 | Chu et al. ................................ | 711/111 |
| 5,675,778 | 10/1997 | Jones ........................................... | 701/1 |
| 5,701,473 | 12/1997 | Braseth et al. ........................... | 707/205 |
| 5,737,549 | 4/1998 | Hersch et al. ............................ | 395/309 |
| 5,742,812 | 4/1998 | Baylor et al. .............................. | 707/8 |
| 5,745,748 | 4/1998 | Ahmad et al. ............................. | 707/10 |
| 5,832,522 | 11/1998 | Bickenstaff et al. ..................... | 707/205 |
| 5,893,086 | 4/1999 | Schmuck et al. .......................... | 707/1 |

OTHER PUBLICATIONS

Corbett, P. F. and Feitelson, D. G., "The Vesta Parallel File System," ACM Transactions on Computer Systems, pp. 225–264, Aug. 1996.

McKusick, Marshall K., Joy, William N., Leffler, Samuel J. and Fabry, Robert S. Fabry, "A Fast File System For Unix," ACM Transactions on Computer Systems, vol. 2, pp. 181–197, Aug. 1994.

Johnson, Theodore, "Supporting Insertions and Deletions in Striped Parallel Filesystems," IEEE, pp. 425–443, 1993.

Kotz, David, "Expanding the Potential for Disk–Directed I/O," IEEE, pp. 490–495, 1995.

*Primary Examiner*—Paul R. Lintz
*Assistant Examiner*—Ella Colbert
*Attorney, Agent, or Firm*—Robert V. Wilder; Richard A. Henkler

[57] ABSTRACT

A method and apparatus is provided in which a data file acquisition program is operable to determine the data transfer speed of a plurality of devices containing a predetermined data file. The methodology calculates a priority ordering of the devices based upon the data transfer speed, and divides the data file request into portions for parallel access and delivery of the requested data file such that all of the portions are delivered to the user at approximately the same time whereby faster devices will be requested to access and deliver larger file portions and relatively slower devices will be assigned to access and deliver relatively smaller portions of the requested data file. Upon receipt of the portions, the requested data file is assembled for further processing by the user.

27 Claims, 3 Drawing Sheets

ACCESSING STORED FILES FROM MULTIPLE STORAGE DEVICES

RELATED APPLICATIONS

The present application is related to applications entitled "APPARATUS AND METHOD FOR SELECTING AN OPTIMUM TELECOMMUNICATIONS LINK", Ser. No. 08/876,413, filed on Jul. 23, 1997 and "RETRIEVING NETWORK FILES THROUGH PARALLEL CHANNELS", Ser. No. 08/931,879, abandoned filed on Oct. 1, 1997, both assigned to the assignee of the present application and included herein by reference.

FIELD OF THE INVENTION

The present invention relates generally to information processing systems and more particularly to an improved methodology for retrieving information files in parallel from a plurality of devices.

BACKGROUND OF THE INVENTION

As computer systems and networked computer systems proliferate, information access time becomes more critical. For many reasons, access time to information databases has a tendency to increase even with frequent equipment upgrades and technology advances. This tendency is apparent in mostly all database accesses which involve extensive networks and mirrored networks which may contain the same information in a plurality of separate storage devices and files.

In many applications, desired information files are maintained in tact at several data storage devices such as, but not limited to hard drive storage units. In such cases, each copy is a so-called "data mirror", i.e. one of several listed devices which contain copies of the same information file which is sought by the user. Each device may be served by the same server or a different server in the same room or a different server in another city or even in another country. The access times to any of the mirror devices would depend on a number of factors including the read-out speed of each storage device.

A plurality of mirrored devices, such as disk drives, may also exist within a single system. In many applications, for both network and single system configurations, there are a plurality of disk drives and many of the disk drives contain many of the same files. On occasion, when a particular device is accessed, or if a system arbitrarily selects one device of a plurality of mirror devices to fill a request for a selected file, the device selected may not be the fastest device of those containing the requested file, or, the device may be equally fast, but the data busses may be of non-equal bandwidth. Moreover, if the non-accessed devices are not being used, those information resources are not being optimally utilized.

Accordingly, there is a need for an enhanced method and processing apparatus which is effective to determine an optimized methodology for accessing and returning a desired data file in a minimal period of time from a plurality of devices containing the desired data file.

SUMMARY OF THE INVENTION

A method and apparatus is provided in which a data file acquisition program is operable to determine the data transfer speed of a plurality of devices containing a predetermined data file. The methodology calculates a priority ordering of the devices based upon the data transfer speed, and divides the data file request into portions for parallel access and delivery of the requested data file such that all of the portions are delivered to the user at approximately the same time whereby faster devices will be requested to access and deliver larger file portions and relatively slower devices will be assigned to access and deliver relatively smaller portions of the requested data file. Rates of data delivery are determined in accordance with data transfer rates which include device transfer rates and data bus throughput rates. Upon receipt of the portions, the requested data file is assembled for further processing by the user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
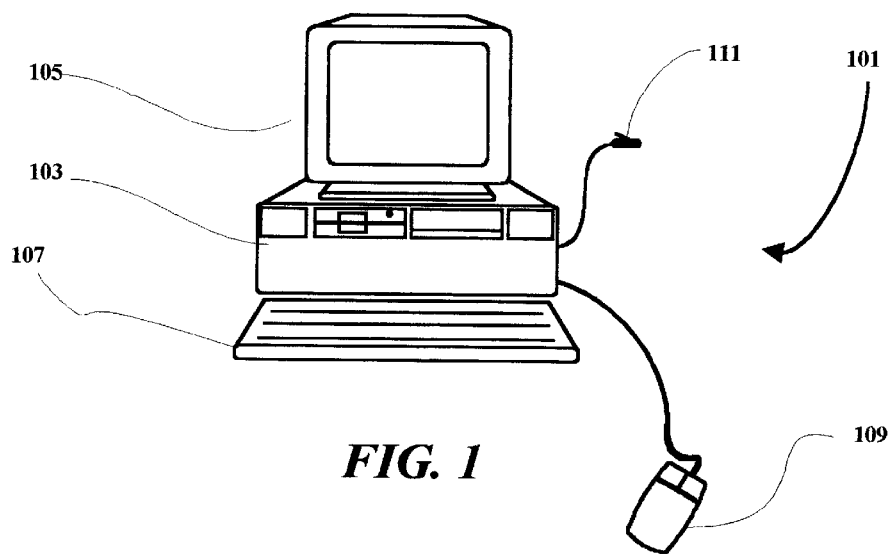
FIG. 1 is a diagram of a computer system in which the present invention may be implemented.

With reference to FIG. 1, the various methods discussed herein may be implemented within a typical computer system 101 which may include a workstation or personal computer. In general, an implementing computer system may include a plurality of processors in a multi-bus system in a network of similar systems. However, since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a cellular system in which case the connector 111 would not be required. The present invention deals with a computer terminal within a network which may have many storage units accessible by the terminal for transferring requested data files from one or more of the storage units to the requesting computer terminal with increased efficiency.

Figure 2:
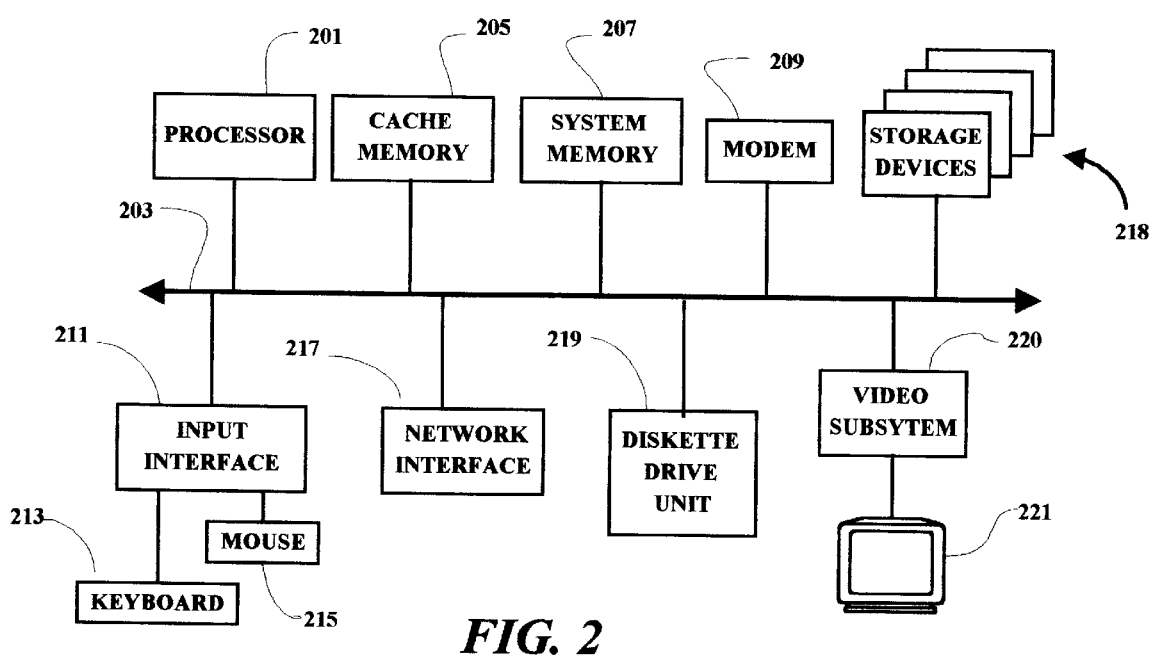
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection to a communication line, such as a telephone line. The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A plurality of storage devices 218, which may comprise hard drive devices, are also coupled to the bus 203. In general, the data files contained on the hard drive storage devices 218 are accessible by any of a plurality of other computer terminals which may be connected in a network configuration to the system bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette. Although the present example is explained in connection with magnetic media storage system, it is understood that media other than magnetic media, including but not limited to optical CDs and solid state digital devices, may also be implemented in addition to or in place of the magnetic media for storing, and making available application programs and/or application data.

For purposes of explaining the operation of an exemplary embodiment, it is noted that each of the storage devices 218, as well as other network storage devices which may be connected to the bus 203 through the network interface 217 for example, may contain exact copies of the same data files. In that regard, such devices may be considered as mirror sites or devices. When a user of one of the terminals within a network desires to acquire a selected data file, or a selected data file is being sought in response to a program being executed, the methodology illustrated in FIG. 3 may be implemented when the network includes a plurality of mirror devices, and each mirror device contains the selected data file.

In operation, when the parallel access methodology begins 301, the implementing program will determine 302 which of a plurality of storage devices are mirror devices and contain the desired data file. The program then samples the mirror devices 303 and their adaptor connections to determine the delivery speed from each device. The device output or transfer speeds are then saved 305 per device to establish a record of which devices are faster than other mirror devices in the network. The data file request is then processed 307 by dividing the data request into portions depending upon the number of devices containing the selected data file. The portions are also sized in accordance with the output speed of the mirror devices such that the faster devices are assigned to return a greater portion of the common data file than are the relatively slower devices. Acquisition assignments to each mirror device are made and parallel requests 309 are sent out to the mirror devices such that all of the data portions acquired are returned to and received by 311 the requesting device at substantially the same time. The data is then assembled 313 from the parallel returned portions and the program is ended 315.

Figure 3:
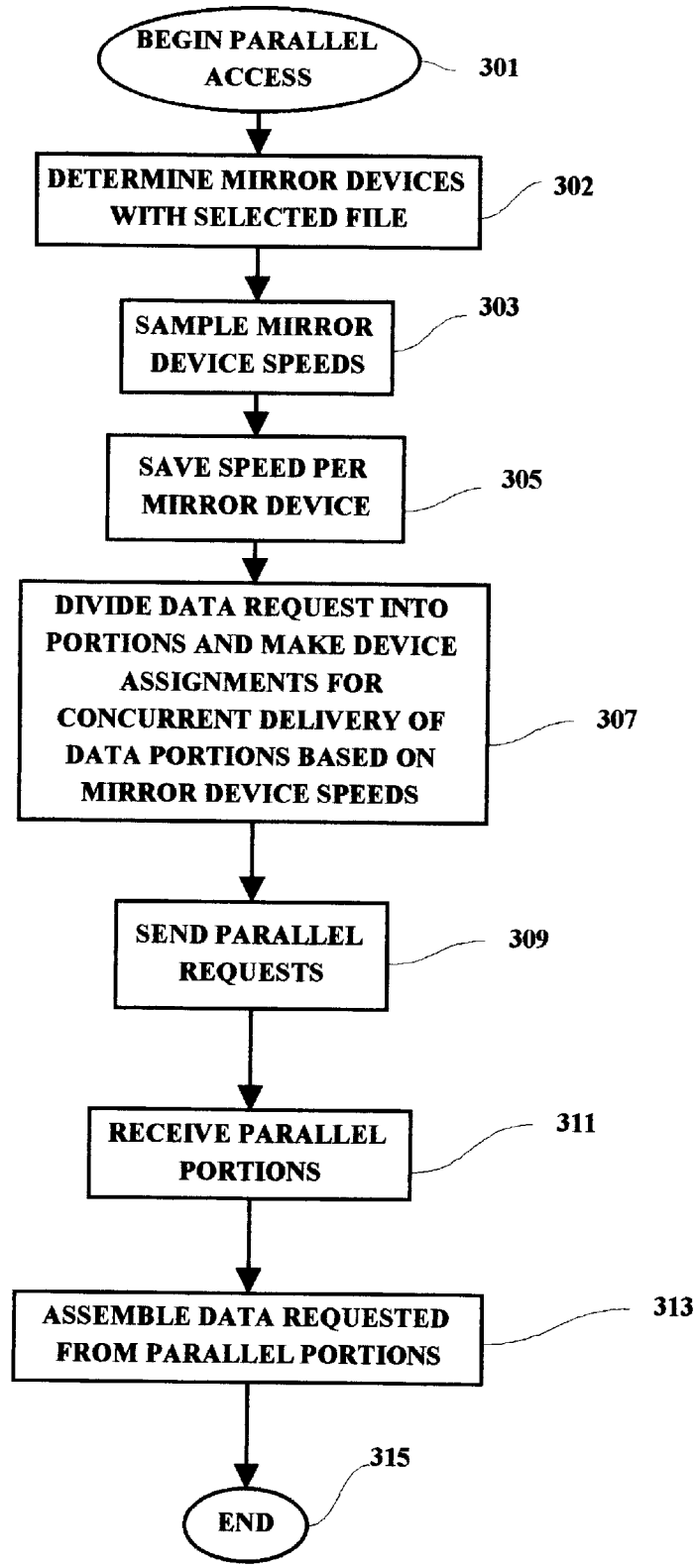
FIG. 3 is a flow chart illustrating an exemplary methodology implemented in accordance with the present invention.
Figure 4:
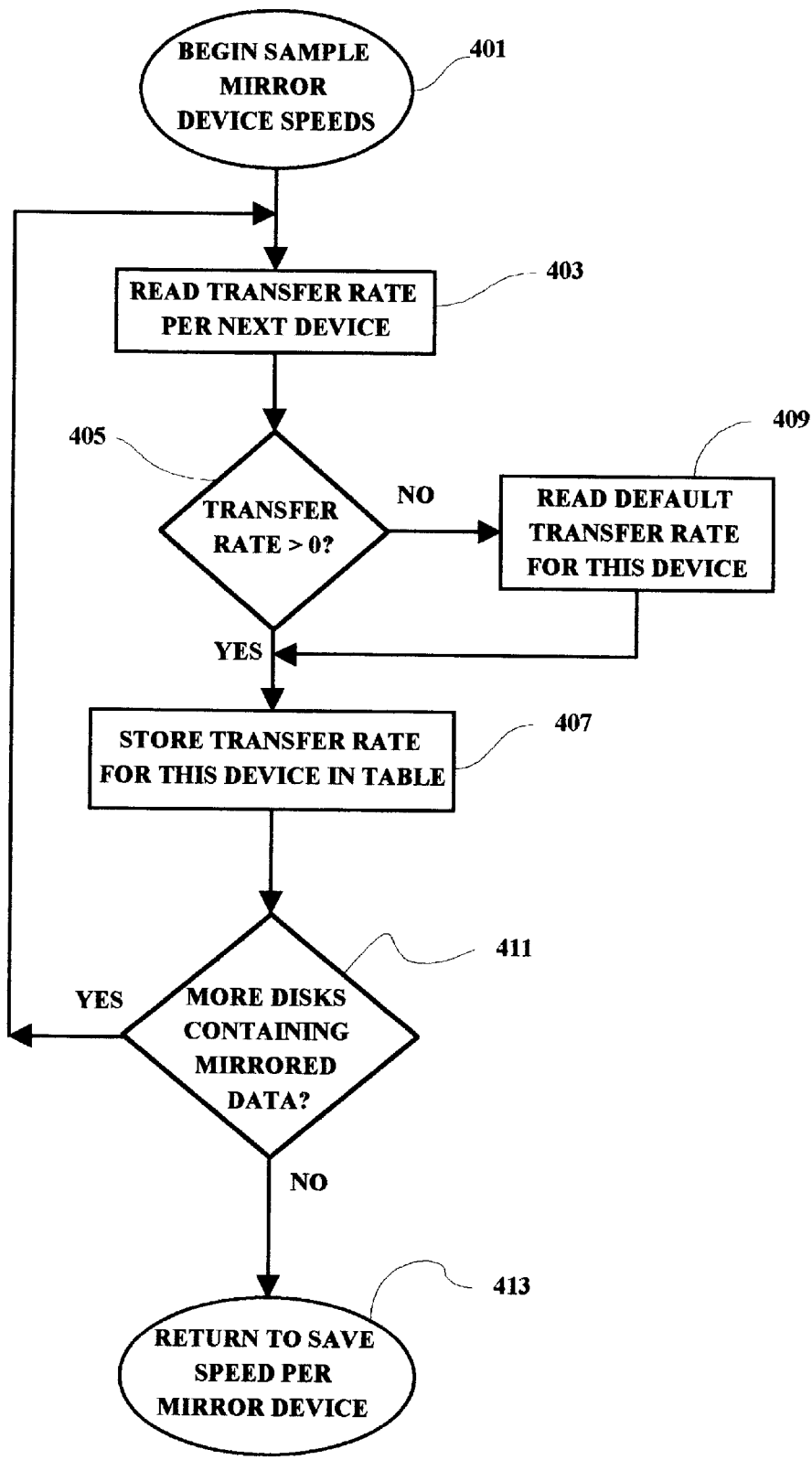
FIG. 4 is a flow chart illustrating the details of one segment of the flow chart shown in FIG. 4.

In FIG. 4, the mirror device speed sampling step 303 of FIG. 3 is illustrated in more detail. When the sampling step is initiated 401, a transfer rate or output speed of a plurality of mirror devices is read 403. This step may be accomplished by a real time device access or sample or by a reference to an existing disk configuration table which contains the data transfer speed of all of the devices in the data mirror array. Next, if the transfer rate is greater than zero 405, the transfer rate or output speed of the sampled device is stored for example in a table 407, and a determination is made 411 concerning whether or not there are more storage devices or disks that contain the mirrored data. If the transfer rate or output speed of the sampled device is not greater than zero 405, for example if the particular device being sampled is not set up to respond by returning a meaningful number, then a default value is established 409 for the particular device being sampled. If there are more devices containing the sought after data file, then the process is repeated for the next device 403. When all of the mirror devices have been sampled or when all of the transfer speeds have been determined, then the processing returns 413 to save 305 the collected speeds for the plurality of mirror devices, and the methodology illustrated in FIG. 3 is continued.

As noted, there are many methods of varying precision which may be implemented to determine the byte size of each data portion requested. Any such method may be implemented herein so long as the method is related to the speed of the channel or device delivering a relatively greater portion of the requested data file or document, such that all of the data portions or segmented requests arrive at approximately the same time to the requesting device.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The monitoring methodology may also be implemented solely in program code stored on a disk or diskette (portable or fixed), or other memory device, from which it may be executed to monitor and/or report system resource conditions as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for accessing a designated file from a plurality of storage devices, each of said plurality of storage devices containing a substantially complete copy of said designated file, said method comprising:

determining a number of storage devices containing at least one said substantially complete copy of said designated file;

defining a plurality of file segments, each of said file segments comprising a different portion of said designated file, said plurality of file segments corresponding in number to said plurality of storage devices; and sending substantially parallel requests for said file segments to corresponding ones of said plurality of storage devices.

2. The method as set forth in claim 1 wherein said sending is accomplished substantially concurrently.

3. The method as set forth in claim 1 wherein said file segments are of differing sizes.

4. The method as set forth in claim 3 and further including:

determining data transfer speed of said storage devices; and assigning different sizes of said file segments to different ones of said storage devices.

5. The method as set forth in claim 4 wherein said assigning is accomplished by assigning larger file segments to faster ones of said storage devices.

6. The method as set forth in claim 5 and further including:
   assembling said file segments into said designated file upon receipt of said file segments from said plurality of storage devices.

7. The method as set forth in claim 1 wherein said plurality of storage devices are located throughout a distributed network, said accessing being accomplished from one terminal within said network.

8. The method as set forth in claim 7 and, before said defining, said method further including:
   determining said plurality of storage devices containing copies of said designated file from a group of storage devices located within said network.

9. The method as set forth in claim 8 wherein said designated file is a data file.

10. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said program signals being selectively effective for accessing a designated file from a plurality of storage devices, each of said plurality of storage devices containing a substantially complete copy of said designated file by accomplishing the steps of:
   determining a number of storage devices containing at least one said substantially complete copy of said designated file;
   defining a plurality of file segments, each of said file segments comprising a different portion of said designated file, said plurality of file segments corresponding in number to said plurality of storage devices; and
   sending parallel requests for said file segments to corresponding ones of said plurality of storage devices.

11. The medium as set forth in claim 10 wherein said sending is accomplished substantially concurrently.

12. The medium as set forth in claim 10 wherein said file segments are of differing sizes.

13. The medium as set forth in claim 12 and further including:
   determining data transfer speed of said storage devices; and
   assigning different sizes of said file segments to different ones of said storage devices.

14. The medium as set forth in claim 13 wherein said assigning is accomplished by assigning larger file segments to faster ones of said storage devices.

15. The medium as set forth in claim 14 and further including:
   assembling said file segments into said designated file upon receipt of said file segments from said plurality of storage devices.

16. The medium as set forth in claim 10 wherein said plurality of storage devices are located throughout a distributed network, said accessing being accomplished from one terminal within said network.

17. The medium as set forth in claim 16 and, before said defining, said program signals are further effective for:
   determining said plurality of storage devices containing copies of said designated file from a group of storage devices located within said network.

18. The medium as set forth in claim 17 wherein said designated file is a data file.

19. An information processing system comprising:
   a processing device;
   a memory unit; and
   a bus connecting said processing device and said memory unit, said processing device being selectively operable for executing a program from said memory for selectively accessing a designated file from a plurality of storage devices, each of said plurality of storage devices containing said designated file, said accessing being accomplished by:
   determining a number of storage devices containing at least one substantially complete copy of said designated file;
   defining a plurality of file segments, each of said file segments comprising a different portion of said designated file, said plurality of file segments corresponding in number to said plurality of storage devices; and
   sending parallel requests for said file segments to corresponding ones of said plurality of storage devices.

20. The information processing system as set forth in claim 19 wherein said sending is accomplished substantially concurrently.

21. The information processing system as set forth in claim 20 wherein said file segments are of differing sizes.

22. The information processing system as set forth in claim 21 and further including:
   means for determining data transfer speed of said storage devices; and
   means for assigning different sizes of said file segments to different ones of said storage devices.

23. The information processing system as set forth in claim 22 wherein said assigning is accomplished by assigning larger file segments to faster ones of said storage devices.

24. The information processing system as set forth in claim 23 and further including:
   means for assembling said file segments into said designated file upon receipt of said file segments from said plurality of storage devices.

25. The information processing system as set forth in claim 19 wherein said plurality of storage devices are located throughout a distributed network, said accessing being accomplished from one terminal within said network.

26. The information processing system as set forth in claim 25 and wherein, before said defining, said program signals are further effective for:
   determining said plurality of storage devices containing copies of said designated file from a group of storage devices located within said network.

27. The information processing system as set forth in claim 26 wherein said designated file is a data file.

* * * * *